July 28, 1942.  E. TAENZER  2,290,918

DRIVE FOR FILM PRINTERS

Filed March 30, 1940

INVENTOR.
ERWIN TAENZER,
BY
ATTORNEY.

Patented July 28, 1942

2,290,918

UNITED STATES PATENT OFFICE 2,290,918

DRIVE FOR FILM PRINTERS

Erwin Taenzer, Brooklyn, N. Y., assignor to Warner Brothers Pictures, Inc., a corporation of Delaware Application March 30, 1940, Serial No. 326,941

8 Claims. (Cl. 95—75)

This invention relates to motion picture apparatus and particularly to printers for motion picture film wherein the negative and positive raw stock are advanced in contact past a light beam projected through the negative to the positive.

The present invention relates to printers of the "non-slip" type, such as disclosed in E. W. Kellogg, U. S. Patent 1,783,045, of November 25, 1930, wherein the films are given a curvature as they pass the printing point in accordance with the difference in length between the negative and positive. The principle enunciated in the Kellogg patent is that if the films are provided with the proper curvature, there will be no slipping of the films with respect to one another as would otherwise occur. The curvature may be only in one film, the variation being in accordance with the difference in unit lengths of each film between perforations.

It is well known that after a film has been developed, a certain amount of shrinkage occurs therein, and as the film ages, the shrinkage generally increases. Also, films developed at the same time may shrink different amounts for other reasons. Thus, if a piece of negative film and a piece of positive film were laid end to end, each film having the same number of perforations, the negative film would be shorter than the raw positive stock. In printing from a negative to a positive wherein the negative reel is made up of a series of negative strips developed at different times, the degree of shrinkage will generally vary throughout the reel according to the difference in age of the various negative strips. By printing with a "non-slip" printer, however, the printer will automatically compensate for the different degrees of shrinkage as the films pass in contact with one another past the light translation or printing point. In order for the printer to function satisfactorily, each of the films must be properly guided before and at the translation point. Provision must also be made for adequately providing for the change of curvature as the reel changes from a negative strip of one shrinkage to a negative strip of a different shrinkage.

The present invention is directed to an improvement in the automatic film curvature controlling elements of the "non-slip" printer, the principal object of the invention being to improve and facilitate the printing of a negative to a positive film with minimum distortion.

Another object of the invention is to increase the curvature of one of the films with a minimum change or movement of the film path determining elements.

A further object of the invention is to obtain better guiding and stabilization of the film at the printing point.

A further object of the invention is to maintain a more constant tension in a variable film loop.

Although the novel features which are believed to be characteristic of this invention are pointed out with particularity in the claims appended herewith, the manner of its organization and the mode of its operation will be better understood by referring to the following description read in conjunction with the accompanying drawing forming a part thereof in which Figure 1 is an elevational view showing the negative and positive film paths provided by the invention;

Figure 1:
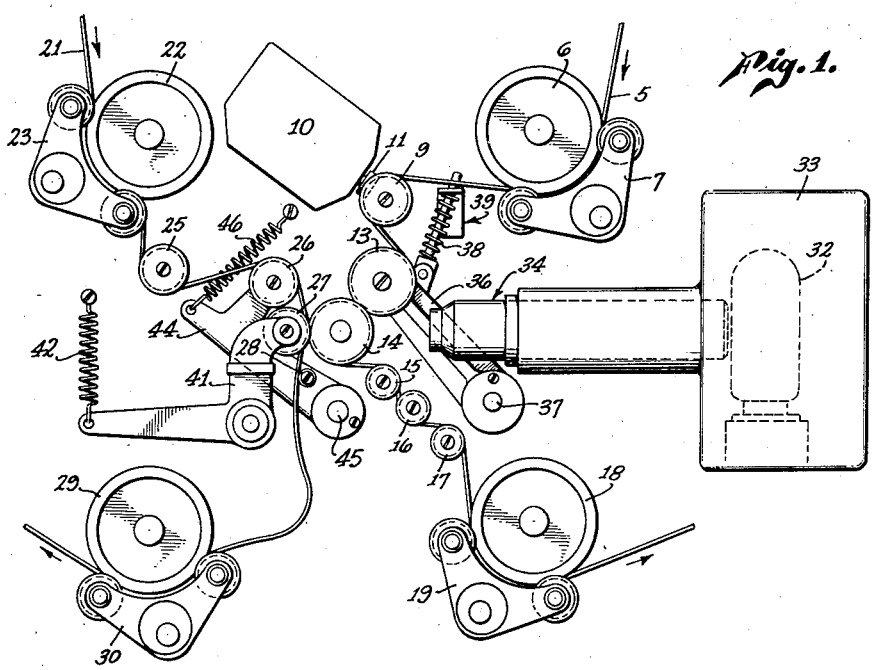

Referring now to Fig. 1, a negative film 5 is fed to the printing point by a sprocket 6 having a pad roller 7, the film then passing around a roller 9 associated with an electric circuit interrupter device 10 operated by a roller 11 adapted to contact one edge of the film. From the roller 9 the film passes around a pressure and guide roller 13, then around the split drum 14 (see Fig. 3), and then through a series of rollers 15, 16 and 17 to the sprocket 18 having a pad roller 19 associated therewith. The negative film comes from a supply reel and is fed to a takeup reel, these reels not being shown.

The positive raw stock 21 is supplied from a sprocket 22, having a pad roller 23 associated therewith, to a guide roller 25, then around a varying loop-forming roller 26, then between a contact pressure roller 27 and roller 14, then around a guide roller 28 to a sprocket 29 having a pad roller 30 associated therewith. Similar to the negative film 5, the positive film supply and takeup reels are not shown.

Light is supplied to the translation or printing point between rollers 14 and 27 from a lamp 32 within a housing 33, the light being projected to the films by an optical system 34. The pressure roller for the negative 5 is mounted on a bracket 36 pivoted at 37 and is pressed against the roller 14 by the tension of a spring 38 mounted on a toggle backet 39. The roller 27 for maintaining the negative in contact with the roller 14 is mounted on a curved crank arm 41 under tension of a spring 42. The loop-forming rollers 26 and 28 are mounted upon a crank arm 44 pivoted at 45 and under tension of a spring 46.

Figure 3:
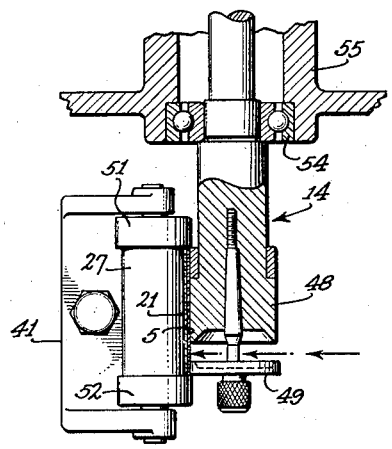
Figure 3 is a cross-sectional view of the printer at the translation point taken along the line 3—3 of Fig. 2.

Referring now to Fig. 3, it is to be noted that the roller 14 is composed of a portion 48 extending over the majority of the width of the film, and a narrow portion 49 for supporting the edge of the film. The space between the portions 48 and 49 permits the light beam from the lamp 32 to be projected to the negative film 5, through which it passes to the positive film 21 shown between the rollers 14 and 27. The flanges 51 and 52 are only for the purpose of housing the ball bearings on which the roller 27 revolves and do not function to guide the film. The roller 14 is shown mounted upon a bearing 54 in the frame 55.

Figure 2:
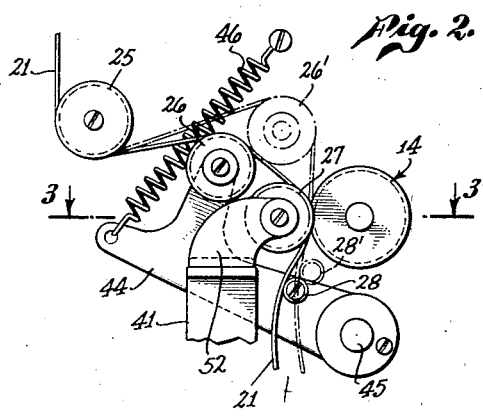
Figure 2 is a detail view of the film loop determining means for the positive film.
Figure 4:
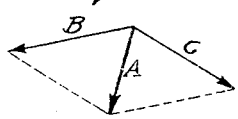
Figures 4 and 5 are vector graphs showing the film tensions in the film loop for films of different shrinkages.
Figure 5:

The operation of the film path determining elements are shown in Figs. 2, 4 and 5, and will now be explained. As the various degrees of shrinkage are encountered, the loop in the positive film between rollers 25 and 27 will vary in size. That is, for a length of film with a certain minimum shrinkage or one in which the negative is of approximately the same length as the positive, the loop will be of a size similar to that shown in Fig. 2 by the solid lines. As negative strips of increased shrinkage are encountered, however, the positive loop will increase in size, and the film dotted lines and dotted rollers 26' and 28' indicate a certain maximum shrinkage position for these elements. As the film loop varies in size, the spring 46 will exert substantially the same force on the loop. To minimize splice effects, the tension of spring 42 should not be weak with respect to the tension of spring 46.

By now referring to Figs. 4 and 5, the effect of this spring force on the film tension will be explained. The arrow A of Fig. 4 represents the force applied by the spring 46 to the loop when the loop is of the size shown by the solid lines in Fig. 2, which corresponds to a negative film of minimum shrinkage. As this force is applied to the film loop, an equal amount of tension is placed on the film on each side of the roller 26, this tension being represented by the length of the arrows B and C.

Fig. 5 shows the same force and tensions in the firm loop when a negative of maximum shrinkage passes through the printer. In this figure, the same spring force A is shown, but it will be noted that the tension on the film represented by the length of the arrows B' and C' is now considerably decreased. These variations in film tensions are not desirable from an operating standpoint because they make it more difficult to guide the film at the printing point.

Applicant's construction decreases the amount of variation necessary in the loop to accommodate a certain range of shrinkages. This feature is the provision of the roller 28 mounted on the bracket 44 and which will form a loop below the printing point. This action, of course, reduces the amount of movement of the roller 26 above the printing point, since the entire amount of loop variation is not compensated for by roller 26. It will be noted that in the maximum negative shrinkage position shown by the dotted lines, the film passes almost in a straight line from the roller 26 past the printing point to the roller 28. However, as the roller 26 moves to the left, the roller 28 also moves to the left and forms the film into a loop below the printing point. This arrangement will either permit the accommodating of a much larger range of shrinkages in the negative film for a given amount of movement than has heretofore been accomplished by other variable loop devices, such as a single roller at the position of roller 26, or will decrease the amount of movement required for a certain range of shrinkages. Tension in the film will also be maintained within a narrower range, which provides a better guiding effect for the film and a better all-around printing action at the printing point.

As the present printer is used for printing sound tracks for motion pictures, the decrease in the variation in the large loop ahead of the printing point minimizes the chances of the film getting out of synchronization with the picture. With a single roller at 26 it has been found that the picture and sound track could get out of synchronization to the extent of one frame. With the present invention the loop variation is reduced to less than one-half of that amount, which is not particularly harmful.

What I claim as my invention is:

1. A contact film printer comprising means for moving a plurality of films having different degrees of shrinkage in contact with each other past an exposing light, means for maintaining one of said films in a definite curved path at the light exposing point, and means for varying the curvature of the other of said films at said exposing point in accordance with the variations in length between said films, said last-mentioned means including loop-forming rollers having a fixed distance between their axes of rotation for varying the curvature of said other film on both sides of said light exposing point as the loop formed by said means varies in size during the the passage of said films through said printer.

2. A contact film printer comprising means for moving a plurality of films having different degrees of shrinkage in contact with each other past an exposing light, means for maintaining one of said films in a definite curved path at the light exposing point, and means for varying the curvature of the other of said films at said exposing point in accordance with the variations in length between said films, said last-mentioned means including means for varying the curvature of said other film on both sides of said light exposing point as the loop formed by said means varies in size during the passage of said films through said printer, said curvature varying means comprising a pivoted bracket under substantially constant tension, and a pair of film guide rollers mounted on said bracket.

3. A contact film printer comprising means for moving a plurality of films having different degrees of shrinkage in contact with each other past an exposing light, means for maintaining one of said films in a definite curved path at the light exposing point, and means for varying the curvature of the other of said films at said exposing point in accordance with the variations in length between said films, said last-mentioned means including means for varying the curvature of said other film on both sides of said light exposing point as the loop formed by said means varies in size during the passage of said films through said printer, said curvature varying means comprising a pivoted bracket under substantially constant tension and a pair of film guide rollers mounted on said bracket, one of said rollers varying the loop in said other film on one side of said exposing point, and the other of said rollers simultaneously varying the loop in said other film on the other side of said exposing point.

4. A contact film printer comprising means for directing an exposing light on a plurality of contiguous films having different degrees of shrinkage, means for causing one of said films to pass in a fixed curved path at the light exposure point and a pair of loop-forming rollers, one on each side of said light exposure points and having a fixed distance between their axes of rotation, the position of said rollers with respect to said exposure point being governed by the difference in shrinkage of said films for varying the degree of curvature of the other of said films on each side of said exposure point as the loop formed by said means varies in size during the passage of said films through said printer.

5. A contact film printer comprising means for directing an exposing light on a plurality of contiguous films having different degrees of shrinkage, means for causing one of said films to pass in a fixed curved path at the point at which they are engaged by said light, means for increasing the loop in the other of said films only on one side of said point at which they are engaged by said light during large degrees in shrinkage between said films, and for producing a loop in said other film on the other side of said point at which they are engaged by said light during small degrees of shrinkage between said films, said means being positioned within each film loop and having a fixed position with respect to one another, said first loop decreasing in size as said second loop increases in size, said loop producing means being adapted to function during the operation of said printer and being movable with respect to said point at which said films are engaged by said light.

6. A contact film printer comprising means for maintaining two films in contact, means for exposing said films to light at their point of contact, one of said contact effecting means comprising a roller having a reduced section through which light is adapted to be projected to said films, a bracket pivoted at one end thereof, a spring attached to the other end of said bracket, and a pair of rollers on said bracket adapted to engage one of said films on each side of its point of contact with the other of said films when low degrees of shrinkage are encountered, while only one of said rollers engages said film when large degrees of shrinkage are encountered, said rollers varying in position during operation of said printer.

7. A device for compensating for differences in shrinkage between films in a contact film printer comprising means for maintaining a plurality of films in contact at one point, a bracket pivoted at one end, a spring attached to the other end of said bracket, and a plurality of rollers on said bracket, one roller being adapted to engage one of said films on one side of said contact point, and another roller to engage said film on the other side of said contact point, both of said rollers effecting the curvature of said engaged film at said contact point during passage of said films through said printer.

8. In a film contact printer, the combination of means for maintaining two films in contact, a bracket, a loop forming roller mounted on said bracket and adapted to form a loop in one of said films on one side of said contact point, another roller mounted on said bracket simultaneously movable with said first roller and adapted to form a loop in said film on the other side of said contact point, said second roller being adapted to increase the loop on its side of said contact point while the other roller decreases the loop on the other side of said contact point during passage of said films through said printer.

ERWIN TAENZER.